United States Patent
Wahibi et al.

(10) Patent No.: US 10,264,117 B2
(45) Date of Patent: Apr. 16, 2019

(54) METHOD AND DEVICE FOR DETECTING A BROKEN BINDER

(71) Applicant: Alcatel Lucent, Nozay (FR)

(72) Inventors: Issam Wahibi, Schaerbeek (BE);
Benoit Drooghaag, Ophain-Bois-Seigneur-Isaac (BE);
Philippe Dierickx, Woluwe-Saint-Lambert (BE)

(73) Assignee: Alcatel Lucent, Boulogne Billancourt (FR)

( * ) Notice: Subject to any disclaimer, the term of this patent is extended or adjusted under 35 U.S.C. 154(b) by 0 days.

(21) Appl. No.: 15/742,688

(22) PCT Filed: Jul. 14, 2016

(86) PCT No.: PCT/EP2016/066739
§ 371 (c)(1),
(2) Date: Jan. 8, 2018

(87) PCT Pub. No.: WO2017/021121
PCT Pub. Date: Feb. 9, 2017

(65) Prior Publication Data
US 2018/0213081 A1    Jul. 26, 2018

(30) Foreign Application Priority Data
Aug. 6, 2015    (EP) .................................. 15306272

(51) Int. Cl.
*H04M 1/76* (2006.01)
*H04M 3/08* (2006.01)
(Continued)

(52) U.S. Cl.
CPC .............. *H04M 3/085* (2013.01); *H04B 3/32* (2013.01); *H04B 3/487* (2015.01); *H04J 3/10* (2013.01);
(Continued)

(58) Field of Classification Search
CPC ....................................... H04M 3/085
(Continued)

(56) References Cited

U.S. PATENT DOCUMENTS 5,256,859 A * 10/1993 Nanos ................. B42C 9/0056
219/492
2014/0153377 A1    6/2014 Snapir et al.

FOREIGN PATENT DOCUMENTS

| EP | 2538568 A1 | 12/2012 |
|---|---|---|
| EP | 2779608 A1 | 9/2014 |

OTHER PUBLICATIONS

International Search Report PCT/ISA/210 for International Application No. PCT/EP2016/066739 dated Jul. 14, 2016.
(Continued)

*Primary Examiner* — Md S Elahee
(74) *Attorney, Agent, or Firm* — Harness, Dickey & Pierce, P.L.C.

(57) ABSTRACT

Embodiments relate to a method for detecting a broken binder in an access network including a plurality of telecommunication lines grouped in respective binders, executed by a detection device, including identifying a plurality of telecommunication lines for which a transmission interruption has been detected within a given time period obtaining line data associated with the respective identified telecommunication lines, for respective pairs of identified telecommunication lines, determining a virtual distance between the two telecommunication lines, in function of the associated line data, determining at least one cluster of telecommunication lines in function of the virtual distances, and detecting a broken binder in function of the determined at least one cluster.

10 Claims, 1 Drawing Sheet

(51) Int. Cl.
     *H04M 3/30*     (2006.01)
     *H04B 3/487*    (2015.01)
     *H04B 3/32*     (2006.01)
     *H04J 3/10*     (2006.01)
     *H04M 3/22*     (2006.01)
     *H04M 11/06*    (2006.01)

(52) U.S. Cl.
     CPC ......... *H04M 3/2209* (2013.01); *H04M 3/306* (2013.01); *H04M 11/062* (2013.01)

(58) Field of Classification Search
     USPC ....... 379/417, 2, 14.01, 15.05, 22.03, 29.07, 379/29.08; 219/492
     See application file for complete search history.

(56) References Cited

OTHER PUBLICATIONS

Written Opinion of the International Searching Authority PCT/ISA/237 for International Application No. No. PCT/EP2016/066739 dated Jul. 14, 2016.

* cited by examiner

METHOD AND DEVICE FOR DETECTING A BROKEN BINDER

CROSS-REFERENCE TO RELATED APPLICATIONS

This application is a national phase under 35 U.S.C. § 371 of PCT International Application No. PCT/EP2016/066739 which has an International filing date of Jul. 14, 2016, which claims priority to European Application No. 15306272.4, filed Aug. 6, 2015, the entire contents of each of which are hereby incorporated by reference.

FIELD OF THE INVENTION

The present invention relates to the field of telecommunication. In particular, the present invention relates to methods and devices for detecting a broken binder in an access network.

BACKGROUND

DSL networks are based on twisted pair copper cables. Between different DSL network equipments (Central Office DSLAM, street cabinets, splitters . . . ), twisted pairs are part of larger cables called binders. Binders can have from dozens pairs, up to more than hundreds pairs. A critical problem occurs when such binder cable is broken because it impacts several End-Users. It needs to be quickly detected and reported to take the appropriate field actions.

A known method for detecting a broken binder comprises regularly collecting line parameters and, based on a preconfigured ports down transition threshold, triggering or clearing a broken binder alarm. This method relies on network topology information for applying the threshold to respective binders. This solution is useful for the rare DSL operators which still have an accurate documentation about their cables infrastructure, but unfortunately it is useless for the majority of operators which don't know the topology of their DSL networks.

SUMMARY

It is thus an object of embodiments of the present invention to propose a method and a device for detecting a broken binder, which do not show the inherent shortcomings of the prior art.

Accordingly, embodiments relate to a method for detecting a broken binder in an access network comprising a plurality of telecommunication lines grouped in respective binders, executed by a detection device, comprising:
  identifying a plurality of telecommunication lines for which a transmission interruption has been detected within a given time period,
  obtaining line data associated with the respective identified telecommunication lines,
  for respective pairs of identified telecommunication lines, determining a virtual distance between the two telecommunication lines, in function of the associated line data,
  determining at least one cluster of telecommunication lines in function of the virtual distances, and
  detecting a broken binder in function of the determined at least one cluster.

Correspondingly, embodiments relate to a detection device for detecting a broken binder in an access network comprising a plurality of telecommunication lines grouped in respective binders, comprising:
  means for identifying a plurality of telecommunication lines for which a transmission interruption has been detected within a given time period,
  means for obtaining line data associated with the respective identified telecommunication lines,
  means for, for respective pairs of identified telecommunication lines, determining a virtual distance between the two telecommunication lines, in function of the associated line data,
  means for determining at least one cluster of telecommunication lines in function of the virtual distances, and
  means for detecting a broken binder in function of the determined at least one cluster.

In some embodiments, the virtual distance is representative of a probability that the two telecommunication lines belong to the same binder, the higher the probability the lower the virtual distance, and determining at least one cluster comprises grouping telecommunications lines having a relatively small virtual distance between them, with respect to other telecommunications lines.

The method may comprise:
  controlling network elements associated with identified telecommunication lines of a given cluster to determine the location of a fault, and
  excluding a telecommunication line from the given cluster in function of the locations of faults.

In some embodiments, the line data include one or more connection entity identifiers and/or crosstalk cancellation data. For example, the connection entity identifiers include a DSLAM identifier and a line card identifier, and wherein the crosstalk cancellation data comprises or allows determining a vectoring group and/or a crosstalk binder. In that case, the virtual distance may be smaller if the two telecommunication lines have the same DSLAM identifier and/or the same line card identifier, and/or belong to the same vectoring group and/or the same crosstalk binder, than if not.

In some embodiments, the line data comprise geographical position data associated with the network equipments connected to the telecommunication line. In that case, the virtual distance between two telecommunication lines associated respectively with network equipments CO1, EU1 and CO2, EU2 may be determined in function of at least one of:
  the distance between CO1 and CO2,
  the distance between EU1 and EU2,
  the area of the quadrilateral CO1, EU1 EU2, CO2,
  the angle between vectors [CO1, EU1] and [CO2,EU2].

Embodiments also relate to a computer program comprising instructions for performing the method mentioned before when said instructions are executed by a computer.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

An access network comprises a plurality of telecommunication lines between network elements such as central office DRAMs, remote terminals in street cabinets, end-user terminals . . . . For example, the telecommunication lines are twisted pair copper cables and the network elements use a DSL technology for communication. The telecommunication lines are grouped in respective binders, which are cables including a set of telecommunication lines.

A detection device 1 can obtain line parameters related to the telecommunication lines. The line parameters specify at least whether a transmission interruption occurred on a telecommunication lines. For example, the DSLAMs and end-user terminals regularly report lines parameters to the detection device 1, and the line parameters include a "Showtime/No Showtime" parameter. The detection device 1 detects a broken binder in function of the line parameters as described hereafter with reference to FIGS. 1 to 3. The detection device 1 is for example a network analyzer which, in addition to the detection of broken binders, performs other monitoring, control and/or troubleshooting tasks related to the access network.

Figure 1:
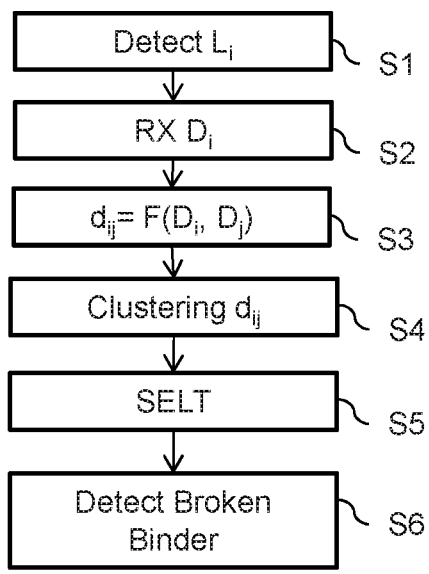
FIG. 1 is a flowchart of a method for detecting a broken binder.

FIG. 1 is a flowchart of a method for detecting a broken binder in an access network, executed by the detection device 1.

The detection device 1 identifies a plurality of telecommunication lines $L_i$ for which a transmission interruption has been detected within a given time period (Step S1). For example, the detection device 1 obtains line parameters on a regular basis, for example every 15 minutes, and identifies the telecommunications lines $L_i$ for which a transmission interruption occurred within the last 15 minutes in function of the "Showtime/No Showtime" parameter.

Then, the detection device 1 obtains line data $D_i$ associated with the respective telecommunication lines $L_i$ (Step S2). The line data $D_i$ can include some of the line parameters and/or data from other sources such as database . . . . Various examples of line data $D_i$ are given hereafter.

Then, for respective pairs of telecommunication lines $L_i$ and $L_j$, the detection device 1 determines a virtual distance $d_{ij}$ between the two telecommunication lines $L_i$ and $L_j$, in function of the associated line data $D_i$ and $D_j$ (Step S3). The virtual distance $d_{ij}$ is representative of a probability or likelihood that the telecommunication lines $L_i$ and $L_j$ belongs to the same binder. For example, the higher the probability, the smaller the virtual distance $d_{ij}$. Various example for determining the virtual distance $d_{ij}$ in function of the line data $D_i$ and $D_j$ are given hereafter. The virtual distances $d_{ij}$ may be determined for each pairs of identified telecommunication lines $L_i$ and $L_j$, and stored in a matrix M. The diagonal elements of the matrix M are non-representative and may be assigned a value 0.

Then, the detection device 1 determines clusters of telecommunication lines $L_i$ in function of the determined virtual distances $d_{ij}$ (Step S4). For example, starting from the matrix M, the detection device 1 applies a clustering algorithm for grouping telecommunications lines $L_i$ which have a small virtual distance between them (with respect to other telecommunication lines), and thus a high probability to share the same physical binder. An example of clustering algorithm is the Hierarchical Clustering Analysis (HCA).

In an embodiment, the detection device 1 controls network elements associated with telecommunication lines $L_i$ of a given cluster to determine the location of a fault (reported for example in terms of line distance from the network element), for example by using Single Ended Line Testing (SELT) (Step S5). In case of a broken binder, the telecommunication lines $L_i$ should report the same fault location. If not, the line (or lines) which has a different fault location may be exclude from the cluster, for example by increasing the virtual distance $d_{ij}$ between this line and the other lines of the cluster and repeating step S4.

Finally, the detection device 1 detects one or more broken binder in function of the determined clusters (step S6). For example, each determined cluster may be identified as a broken binder. Alternatively, only the determined clusters which match a detection criterion, such as comprising a minimum number of lines, may be identified as broken binders. Based on the detected broken binder(s), fast action can be planned to solve the issue.

Steps S1 to S6 are repeated on a regular basis (for example based on the 15 minutes period associated with obtaining line parameters), thus allowing to detect a broken binder shortly after breaking.

It is remarkable that, by determining virtual distances representative of a probability of sharing the same binder in function of line data $D_i$, the telecommunication lines may be grouped in clusters corresponding to respective binders without the need to use topology information about the access network. In other words, the line data $D_i$ does not need to include topology information specifying which lines belong to which binders. This allows DSL operators which do not have detailed topology information about their networks to detect a broken binder efficiently, and take the appropriate corrective actions.

In one embodiment, the line data $D_i$ include one or more connection entity identifiers and/or crosstalk cancellation data.

The connection entity identifier includes for example a DSLAM identifier and/or a line card identifier.

The crosstalk cancellation data include for example a crosstalk cancelation matrix, allowing the detection device 1 to determine a vectoring group identifier and/or a crosstalk binder identifier of the telecommunication line $L_i$. A crosstalk binder is defined as a group of lines among the same vectoring group which have a strong electromagnetic coupling between them according to some predefined criteria. Techniques have been proposed to determine crosstalk binders inside a vectoring group using a clustering algorithm. If DSL lines share the same crosstalk binder, the probability that they are among the same physical binder is higher.

The virtual distance $d_{ij}$ between two telecommunication lines $L_i$ and $L_j$ is determined in function of the connection entity identifiers and/or crosstalk cancellation data, based on the assumption that if the two lines share the same connection entity and/or belong to the same vectoring group and/or crosstalk binder, the probability that they belong to the same physical binder is higher.

For example, the virtual distance $d_{ij}$ is initialized to a predetermined value p1. Then:

the virtual distance $d_{ij}$ is divided by a predetermined value k1 if the two lines have the same DSLAM, and/or the virtual distance $d_{ij}$ is divided by a predetermined value k2 if the two lines have the same line card, and/or the virtual distance $d_{ij}$ is divided by a predetermined value k3 if the two lines belong to the same vectoring group, and/or the virtual distance $d_{ij}$ is divided by a predetermined value k4 if the two lines belong to the same crosstalk binder.

Therefore, the smaller possible value of the virtual distance is $d_{ij\_min} = p1/(k1 \times k2 \times k3 \times k4)$, with p1 the initial and the maximum possible virtual distance, and k1, k2, k3 and k4 are respectively the ratio (>1) corresponding to the cases when the lines share the same DSLAM, the same LT card, the same vectoring group, and the same crosstalk binder.

DSL operators usually maintain databases which contain the geographical positions of each network equipments (central office, end user, remote terminal . . . ). Accordingly, in an embodiment, the line data $D_i$ include geographical position data associated with the network equipments connected to the telecommunication line $L_i$.

The geographical position may be specified for example by geographical coordinates (such as longitude and latitude or Cartesian coordinates) and/or by an address (which may be converted to geographical coordinates by a geocoding process).

For the respective lines $L_i$, the detection device 1 determines a segment [COi, EUi] or [$RT_i$, $EU_i$] on a map a as straight connection between the Central Office DSLAM or the Remote Terminal and the End-User associated with the line $L_i$. Then, the detection device 1 correlates the positions of the respective segments [COi/RTi, EUi] to determine the virtual distances $d_{ij}$.

Determining the virtual distances $d_{ij}$ may relies on specificities of DSL lines like:
  Lines length is limited depending of technology (EG: ASDL is 5 km, VDSL2 is 2 km . . . )
  Lines length is known or can be estimated based on Electrical Length, Hlog, attenuation . . . .
  Usually two end-customer using the same binder are connected to the same central office.

Accordingly, the detection device 1 can use some geographical correlation on the [COi, EUi] segments to determine if they belong to the same hinder. For example (but not limited to), geographical correlation can be based on combinations of decisions like:
  Originating from the same (or very close) Central Office (CO)
  Maximum area size included in the quadrilateral formed by the corners in the sequence: CO1>EU1>EU2>CO2
  Maximum distance between End-Users EU1 and EU2
  Maximum angle between vectors [CO1, EU1] and [CO2, EU2]
  . . .

Figure 2:
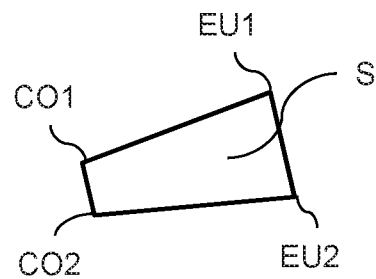
FIG. 2 shows the geographical positions of segments associated with telecommunication lines.

Taking as specific example two segments with following decimal degrees geographical coordinates [latitude, longitude]:
  CO1=[50.471928,4.463293]; EU1=[50.473908, 4.482283];
  CO2=[50.471400,4.463293]; EU2=[50.471040, 4.485008];

FIG. 2 represents the segments [CO1, EU1] and [CO1, EU1] on a map and the surface formed by the corners in the sequence CO1>EU1>EU2>CO2.

The detection device 1 can convert longitude and latitude into Cartesian coordinates using:

$$x = R * \cos(lat) * \cos(lon)$$

$$y = R * \cos(lat) * \sin(lon)$$

$$z = R * \sin(lat)$$

where R is the mean radius of the Earth=6371 km
In this example, this gives:

$$CO1\_cart = [4.0426, 03156, 4.9140] * 10 == [x_1, y_1, z_1]$$

$$EU1\_cart = [4.0423, 0.3169, 4.9142] * 10^3 = [x_2, y_2, z_2]$$

$$CO2\_cart = [4.0426, 0.3156, 4.9140] * 10^3 = [x_3, y_3, z_3]$$

$$EU2\_cart = [4.0425, 0.3171, 4.9140] * 10^3 = [x_4, y_4, z_4]$$

The detection device 1 can determine the (real) distance $D_{k,l}$ between any of those coordinates using:

$$D_{k,l} = \sqrt{(x_k - x_l)^2 + (y_k - y_l)^2 + (z_k - z_l)^2}$$

For CO1 and CO2, this give $D_{co1,co2} = 0.0587$ km,

Taking as assumption that this is a planar surface (valid for small area on the earth's surface), the detection device 1 can calculate the surface of the ordinary quadrilateral (CO1>EU1>EU2>CO2) by splitting it in two triangles T1 (CO1>EU1>EU2) and T2 (CO1>EU2>CO2) and applying Heron's formula:

$$S_{triangle} = \sqrt{s(s-a)(s-b)(s-c)} \text{ where } s = \frac{a+b+c}{2}$$

and a, b and c are the length of the size of the triangle,

Applying this to our example, this give $S = S_{T1} + S_{T2} = 0.2355 + 0.0451 = 0.2806$ km$^2$.

The detection device 1 can thus detect that the distance between CO1 and CO2 is small and that surface between the two segments is also small. In such a case, the probability that the twister pair [CO1, EU1] is going through the same binder as [CO2, EU2] is high. Especially if both End-Users have Showtime impact at the same 15 minutes interval. If several other segments [COn, EUn] are correlated together during the same 15 minutes interval, this increases the probability of the broken binder detection. Knowing that binders are composed of several twisted pairs, when one binder is broken, it will result in several segments impacted during the same 15 minutes interval and a higher probability of detection.

Generalization of this concept to "n" lines $L_i$ losing Showtime at the same 15 minutes interval, the detection device 1 can determine virtual distances $d_{ij}$ as a weighted sums of various geographical criteria's, such as the distance (CO1, CO2), the surface of the quadrilateral (CO1>EU1>EU2>CO2), or other appropriate geographical criteria, depending for example on network deployment, DSL technology . . . . Other examples include the distance between End-Users EU1 and EU2, the angle between vectors [CO1, EU1] and [CO2,EU2] . . . .

Other embodiments may use other types of line data Di and determination of the virtual distance $d_{ij}$. Various embodiments may be combined, for example by determining the virtual distance $d_{ij}$ as a weighted sum of, on the one hand, a virtual distance based on connection entity identifiers and/or crosstalk cancellation data and, on the other hand, a virtual distance based on geographical positions.

Figure 3:
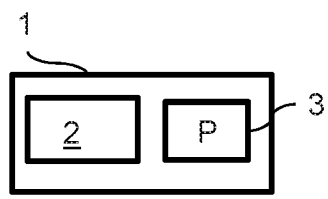
FIG. 3 is a structural view of a detection device.

FIG. 3 is a structural view of the detecting device 1, which comprises a processor 2 and a memory 3. The memory 3 stores a computer program P which, when executed by the processor 2, causes the detecting device 1 to execute the method described above with reference to FIG. 1.

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represents various processes which may be substantially represented in computer readable medium and so executed by a computer or processor, whether or not such computer or processor is explicitly shown.

Embodiments of the method can be performed by means of dedicated hardware and/of software or any combination of both.

While the principles of the invention have been described above in connection with specific embodiments, it is to be clearly understood that this description is made only by way of example and not as a limitation on the scope of the invention, as defined in the appended claims.

The invention claimed is:

1. A method for detecting a broken binder in an access network comprising a plurality of telecommunication lines grouped in respective binders, executed by a detection device, comprising:
   identifying a plurality of telecommunication lines for which a transmission interruption has been detected within a given time period,
   obtaining line data associated with the identified telecommunication lines,
   for respective pairs of identified telecommunication lines, determining a virtual distance between two of the identified telecommunication lines, in function of the associated line data,
   determining at least one cluster of telecommunication lines in function of the virtual distance, and
   detecting a broken binder in function of the determined at least one cluster.

2. Method according to claim 1, wherein the virtual distance is representative of a probability that the two telecommunication lines belong to the same binder, the higher the probability the lower the virtual distance, and determining at least one cluster comprises grouping telecommunications lines having a relatively small virtual distance between them, with respect to other telecommunications lines.

3. Method according to claim 1, comprising:
   controlling network elements associated with identified telecommunication lines of a given cluster to determine a location of a fault, and
   excluding a telecommunication line from the given cluster in function of locations of faults.

4. Method according to claim 1, wherein the line data include one or more connection entity identifiers and/or crosstalk cancellation data.

5. Method according to claim 4, wherein the connection entity identifiers include a DSLAM identifier and a line card identifier, and wherein the crosstalk cancellation data comprises or allows determining a vectoring group and/or a crosstalk binder.

6. Method according to claim 5, wherein the virtual distance is smaller if the two telecommunication lines have the same DSLAM identifier and/or the same line card identifier, and/or belong to the same vectoring group and/or the same crosstalk binder, than if not.

7. Method according to claim 1, wherein the line data comprise geographical position data associated with network equipments connected to the telecommunication line.

8. Method according to claim 7, wherein the virtual distance between two telecommunication lines associated respectively with network equipments CO1, EU1 and CO2, EU2 is determined in function of at least one of:
   the distance between CO1 and CO2,
   the distance between EU1 and EU2,
   the area of the quadrilateral CO1, EU1 EU2, CO2,
   the angle between vectors [CO1, EU1] and [CO2,EU2].

9. Computer program comprising instructions for performing the method of claim 1 when said instructions are executed by a computer.

10. A detection device for detecting a broken binder in an access network comprising a plurality of telecommunication lines grouped in respective binders, comprising:
   means for identifying a plurality of telecommunication lines for which a transmission interruption has been detected within a given time period,
   means for obtaining line data associated with the identified telecommunication lines,
   means for, for respective pairs of identified telecommunication lines, determining a virtual distance between two of the identified telecommunication lines, in function of the associated line data,
   means for determining at least one cluster of telecommunication lines in function of the virtual distance, and
   means for detecting a broken binder in function of the determined at least one cluster.

* * * * *